United States Patent [19]

Tsuganezawa et al.

[11] 4,214,893
[45] Jul. 29, 1980

[54] METHOD OF MAKING A MAGNETIC POWDER

[75] Inventors: Kunihiro Tsuganezawa; Teruo Kobayashi; Shigehisa Harada; Yoichi Nishizawa; Tomoya Kusunose, all of Kawasaki, Japan

[73] Assignee: Nippon Columbia Kabushikikaisha, Tokyo, Japan

[21] Appl. No.: 849,327

[22] Filed: Nov. 7, 1977

Related U.S. Application Data

[63] Continuation-in-part of Ser. No. 547,541, Feb. 6, 1975, abandoned.

[51] Int. Cl.² ............................................. H01F 1/02
[52] U.S. Cl. ............................... 75/0.5 AA; 148/105
[58] Field of Search .................... 148/105; 75/0.5 AA

[56] References Cited

U.S. PATENT DOCUMENTS 3,943,012  3/1976  Tamai et al. .................... 75/0.5 AA
3,966,510  6/1976  Aonuma et al. ................. 75/0.5 AA

OTHER PUBLICATIONS

Harada et al., *IEEE Transactions*, Sep. 1972, pp. 468-470.

*Primary Examiner*—M. J. Andrews
*Attorney, Agent, or Firm*—Hill, Van Santen, Steadman, Chiara & Simpson

[57] ABSTRACT

A method is provided for making a magnetic powder composed principally of cobalt from a mixture solution containing metal salts, such as cobalt salt, and the like, catalysts, such as palladium chloride, and the like, and reducing agents, such as sodium hypophosphite, and the like. Protein, such as albumin or hemoglobin, is added to the mixture solution to promote dispersion of cobalt particles therein. The magnetic powder thus obtained is suitable for use in the production of audio and video tapes.

16 Claims, 25 Drawing Figures

1000Å

1000Å

1000Å

2000Å

2000Å

2000Å

2000Å

2000Å

2000Å

2000Å

2000 Å

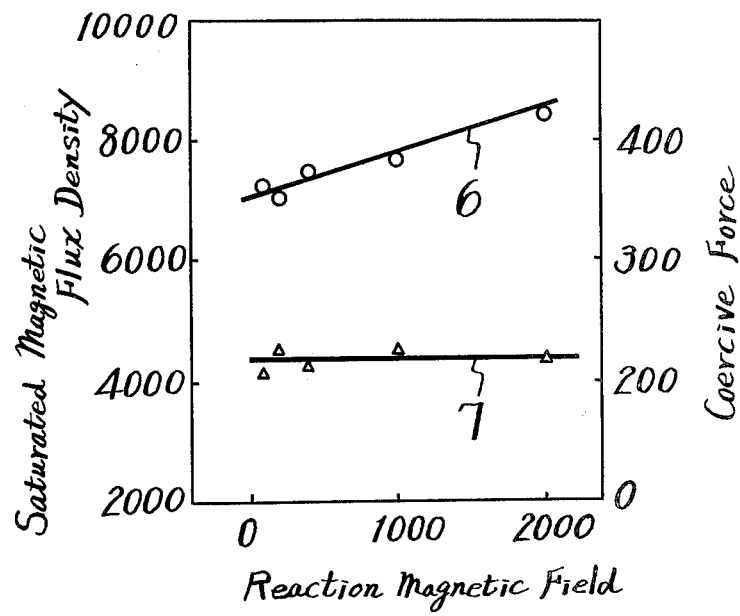
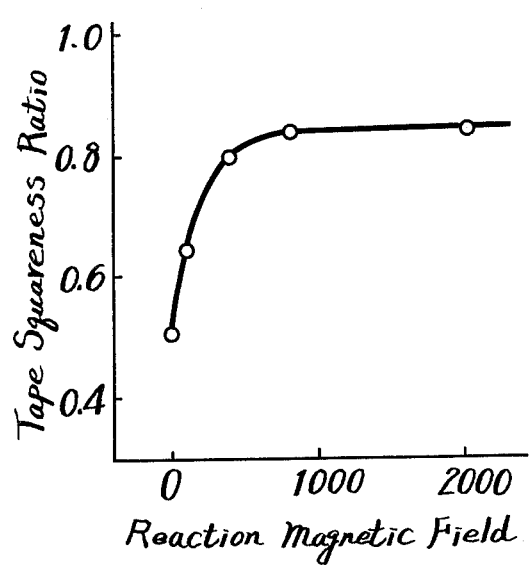
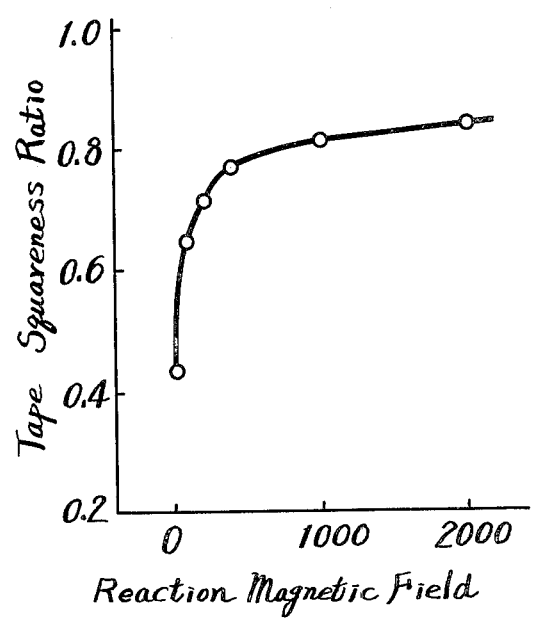

2000Å

2000Å

2000Å

METHOD OF MAKING A MAGNETIC POWDER

RELATED APPLICATION

This application is a continuation-in-part of our earlier filed U.S. patent application Ser. No. 547,541, filed Feb. 6, 1975 now abandoned.

BACKGROUND OF THE INVENTION

1. Field of the Invention

This invention relates to a method of making magnetic particles adapted for use in the production of magnetic recording media, such as audio, video and like tapes, and more particularly to a method of making magnetic substances composed principally of cobalt which are uniform in particle size and excellent in magnetic properties.

2. Description of the Prior Art

It is already known to the art, for example, in IBM Technical Disclosure Bulletin vol. 9, No. 3, August 1966, page 320, to add a small amount of palladium chloride solution with its pH adjusted either to a solution containing cobalt ions, or to a solution containing cobalt ions and nickel ions, to heat the resulting solution up to a temperature close to its boiling point in the presence of a reducing agent, such as sodium hypophosphite, and to form, as a magnetic powder, a precipitate resulting from the ensuing chemical reaction.

However, the magnetic particles composed principally of cobalt, thus obtained, are almost non-uniform in particle size, and also are not well dispersed. Therefore, it is difficult to obtain magnetic particles of this composition having uniform size and shape, and hence having the excellent magnetic characteristics which are required for magnetic recording media.

The U.S. Pat. No. 3,607,216 and certain other prior art suggests that a viscosity improver containing gelatin can be added to the reducing agent to improve the viscosity of the magnetic powder, thereby to reduce the particle size thereof.

There has now been discovered a new and very useful process for making cobalt-type magnetizable particles in which, in place of gelatin, one employs a protein such as albumin or hemoglobin.

SUMMARY OF THE INVENTION

In accordance with this invention, a magnetic powder composed principally of cobalt is made from a mixture solution containing metal salts, such as cobalt salt, and, for example, nickel and iron salts. Such a mixture solution is subjected to reducing conditions to form a magnetic precipitate by adding thereto a catalyst, such as palladium chloride, or the like, and a reducing agent, such as sodium hypophosphite, or the like. At least one water soluble protein, such as albumin or hemoglobin is added to such mixture solution containing such reducing agent. The resulting mixture is heated to a temperature near or even at its boiling point until a precipitate is formed. This precipitate, when separated and dried, results in a powder of the desired dispersed, uniform magnetic particles. This magnetic powder is comprised principally of cobalt, and the magnetic particles therein are uniform in size and organized in arrangements resembling chains or strings of beads, and this magnetic powder exhibits excellent magnetic characteristics.

The novelty of the present invention resides in the production of a dispersed magnetic powder composed principally of cobalt and having a uniform particle size which is achieved by adding a water soluble protein to a mixture solution as described herein which contains also a reducing agent.

One object of this invention is to provide a method of making a magnetic powder composed principally of cobalt from a mixture solution containing (a) metal salts, such as iron, cobalt, nickel and like metal salts, or metal salts of those metals forming magnetic alloys with the above metal salts, such as chromium and like metal salts, (b) a catalyst composed of the Group VIII-B and Group I-B metals (of the Periodic Table of the Elements) and their salts, such as, for example, palladium chloride, and (c) a reducing agent composed of hyphophosphate, boron hydride, hydrazine and their derivatives, such as sodium hypophosphites and the like, to which mixture solution is added at least one selected protein to obtain a desired particle size.

Another object of this invention is to provide a method of making a magnetic powder in which metal ions are uniformly dispersed in a three-dimensional network structure of protein to form nuclei, or are disposed, in micelles of this network.

Another object of this invention is to provide a method of making a magnetic powder of high coercive force by selectively adding proteins.

Another object of this invention is to provide a method of making a magnetic fine powder composed of extremely small particles.

Another object of this invention is to provide a method of making a magnetic powder in which sodium carboxymethyl cellulose is added to the aforesaid mixture solution to promote dispersion of metal ions and enhance the magnetic properties of the magnetic powder.

Another object of this invention is to provide a method of making a magnetic powder in which hydrazine hydrate, hydrazine hydrochloride or hydrazine sulfate is added as a reducing agent to prevent a lowering of the crystallinity of the resulting fine particles comprising such magnetic powder due to mixing of phosphorus and also enhance the magnetic properties of such magnetic powder.

Still another object of this invention is to provide a method of making a magnetic powder in which metal salts are reduced by the aforesaid reducing agent in the presence of a magnetic field to arrange the magnetic particles comprising such magnetic powder along generally straight lines.

Other objects, features and advantages of this invention will become apparent to those skilled in the art from the following description taken in conjunction with the accompanying drawings.

BRIEF DESCRIPTION OF THE DRAWINGS

In the drawings (which are to be considered with Embodiments herein below presented):

FIGS. 20, 21 and 25 are graphs showing magnetic properties of certain ferromagnetic alloy particles;

DETAILED DESCRIPTION

Figure 1:
FIGS. 1 through 4 are each an electron micrograph of cobalt particles obtained by methods not part of this invention.

This invention provides a method for making magnetic particles by adding a catalyst, a reducing agent, and hemoglobin or albumin as protein, to metal salts, as is the case with the aforementioned United States patent, but, in this invention, the amounts of these components are specified so as to obtain chained cobalt alloy particles of uniform particle size.

The present inventors have not as yet fully clarified by what mechanism albumin and/or hemoglobin acts on cobalt irons. However, the present inventors consider that cobalt ions are uniformly dispersed in the network structure of such a protein or are arranged in micelles composed of such protein particles, and then are reduced through chemical reactions, such as shown in the following exemplary equations, and grown into cobalt fine particles, but there is no wish to be bound by theory therein. Thus, at first, palladium is formed by the following interaction of hypophosphite and palladium chloride,

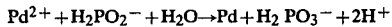
$$Pd^{2+} + H_2PO_2^- + H_2O \rightarrow Pd + H_2PO_3^- + 2H^+$$

and then the following reaction takes place, with the palladium serving as a catalyst,

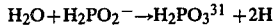
$$H_2O + H_2PO_2^- \rightarrow H_2PO_3^{31} + 2H$$

forming nascent hydrogen. By this nascent hydrogen, the following reaction:

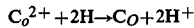
$$C_o^{2+} + 2H \rightarrow C_O + 2H^+$$

is caused, and, at the same time, a cobalt alloy containing phosphorus is produced.

The albumim and/or hemoglobin used in this invention eventually serves to uniformly disperse cobalt fine particles when added to a starting system at the rate of from about 0.5 to 100 g, preferably about 2 to 30 g, per liter of distilled water in the starting solution. With less than about 0.5 g of such a protein, for example, the desired effect resulting from such an addition of protein is not obtained (uniform dispersion of cobalt particles is not achieved), and with more than about 100 g of such a protein, the mixture solution becomes viscous and the speed of the above reactions becomes very low and cannot be practical.

The present invention in one aspect involves first preparing a starting aqueous solution containing (a) cobalt ions, (b) a catalytically effective amount of ions selected from the Groups VIII-B and I-B of the Periodic Table of the Elements, and (c) a reducing agent. Then, to this starting solution is added a dissolved, water soluble protein (albumin and/or hemoglobin), in the amount above indicated. Thereafter, the resulting solution is heated to a temperature in the range from about 20° C. below such resulting solution's boiling point up to its boiling point for a time at least sufficient to form a precipitate of magnetizable particles.

Such a resulting solution containing such protein before being so heated comprises on a 100 weight percent total solution basis:

(A) from about 0.5 to 10 weight percent of at least one water soluble dissolved cobalt salt, (B) from 0 to about 1.0 weight percent of at least one water soluble dissolved metal salt of at least one ferromagnetic metal selected from the group consisting of manganese, chromium, titanium, and osmium, (C) from about 0.5 to 10.0 weight percent of at least one water soluble dissolved reducing agent, (D) from about 0.0001 to 0.2 weight percent of at least one water soluble dissolved metal salt catalyst wherein the metal is selected from the class consisting of Group VIII-B and Group I-B of the Periodic Table of the Elements, (E) from about 0.1 to 3.0 weight percent of at least one water soluble dissolved protein selected from the group consisting of albumin and hemoglobin, (F) sufficient water soluble dissolved base to produce in said solution a pH ranging from about 7.0 to 13.5, and (G) from about 65 to 95 weight percent water.

The weight ratio of dissolved cobalt to all other dissolved metals in such resulting solution is in the range from about 1:10 to 1:1 (and preferably from about 1:5 to 1:2).

Such a resulting solution can be prepared by any convenient procedure as those skilled in the art will readily appreciate. However, in a preferred practice of the process of this invention, one first separately prepares a first solution and a second solution and then mixes such solutions together. Thus, the first solution comprises on a 100 weight percent total first solution basis, (1) from about 0.5 to 10 weight percent of at least one water soluble dissolved cobalt salt, (2) from 0 to about 1.0 weight percent of at least one water soluble dissolved metal salt of at least one ferromagnetic metal selected from the group consisting of manganese, chromium, titanium, and osmium, (3) from about 0.5 to 10.0 weight percent of at least one water soluble dissolved reducing agent, (4) from about 0.1 to 3.0 weight percent of at least one water soluble dissolved protein selected from the group consisting of albumin and hemoglobin, (5) sufficient water soluble dissolved base to produce in said solution a pH ranging from about 7.0 to 13.5, (6) from about 65 to 95 weight percent water, and (7) the weight ratio of cobalt to all other metals in said first solution being in the range from about 1:10 to 1:1.

The second solution comprises on a 100 weight percent total second solution basis, (1') from about 0.01 to 10 weight percent of at least one water soluble dissolved metal salt catalyst wherein the metal is selected from the class consisting of Group VIII-B and Group I-B of the Periodic Table of the Elements, and (2') from about 65 to 95 weight percent of water.

Conveniently, in making the first solution, the protein is itself preliminarily dissolved in water before being admixed with other previously dissolved components of a first solution. The amount of such second solution admixed with such first solution is typically and conveniently such as to produce a resulting solution which after one adds thereto sufficient dissolved aqueous alkali metal hydroxide to produce therein a pH in the range from about 7.0 to 13.5, contains dissolved cobalt and dissolved all other metals in amounts within the above indicated ranges.

After formation from such a solution by heat (as indicated), the precipitate is separated (as by decantation, filtering, centrifuging, or the like), washed with water (preferably distilled or deionized water), and dried. Drying is preferably and conveniently accomplished in air at a temperature ranging from about 20° to 120° C.

The heating of a starting solution is preferably accomplished using a temperature in the range from about 90° to 100° C. Typical heating times range from about 0.1 to 2 hours, though longer and shorter times can be employed.

Conveniently and preferably, the cobalt salt is selected from the group consisting of cobalt sulfate, cobalt chloride, cobalt bromide, cobalt sulfonate, and the like.

Convenient and preferred such water soluble reducing agents are selected from the group consisting of alkali metal hypophosphites, hydrazine hydrate, hydrazine hydrochloride, and hydrazine sulfate. Preferably the alkali metal hypophosphite is sodium. A particularly preferred class of reducing agents comprises hydrazine hydrate, hydrazine hydroxhloride and hydrazine sulfate.

A presently particularly preferred metal salt catalyst is palladium chloride.

A convenient and preferred class of bases comprises alkali metal hydroxides (more preferably, sodium hydroxide).

Preferably, water used in the practice of this invention is distilled. Deionized water may be used if desired.

In one preferred form of practicing the process of this invention, a starting solution before the heating thereof additionally has dissolved therein from about 0.05 to 10 weight percent alkali metal carboxymethyl cellulose on a total 100 weight percent solution basis. Preferably, the alkali metal carboxymethyl cellulose is sodium carboxymethyl cellulose. Alkali metal carboxymethyl cellulose improves the squareness ratio in magnetic type constructions using product particles of this invention by increasing configuration anisotropy.

In another preferred form of practicing the process of this invention, the heating is conducted with the solution undergoing such heating being continuously in the presence of a magnetic field having a field strength of from about 50 to 5000 Oersteds, independently of whether or not carboxymethyl cellulose is used or of other considerations, such as the particular type of reducing agent, protein, or catalyst employed.

The product of the process of this invention is a magnetizable material in powder form. This powder has a particle size ranging from about 0.005 to 0.1 microns and this material comprises on a 100 weight percent total basis (A) from about 85 to 95 weight percent of metallic particles, and (B) from about 5 to 15 weight percent of protein.

The magnetic particles are further characterized by having (1) an individual discrete particle size ranging from about 50 to 1000 Å, and (2) substantially all of said particles being in the physical form of a plurality of chains, each individual chain generally containing at least four of said particles in adjacent relationship to each other.

The magnetic particles themselves comprise on a bulk 100 weight percent total metal particle weight basis (1) from about 20 to 100 weight percent cobalt, and (2) from about 0 to 80 weight percent of at least one other ferromagnetic metal selected from the group consisting of manganese, chromium, titanium, and osmium.

No other way besides the process of the present invention is now known for making such a magnetic material.

In another form, a magnetizable product of this invention additionally contains from about 0.05 to 10 weight percent alkali metal carboxymethyl cellulose (preferably sodium carboxymethyl cellulose) on a 100 weight percent total weight basis.

One preferred form of magnetizable product of this invention is one which has been prepared in the presence of a magnetic field having a field strength of from about 50 to 5000 Oersteds.

The magnetizable product of this invention can be incorporated into the magnetizable layer of magnetic recording medium of the type comprising a substrate member and a magnetizable layer comprising magnetizable composition affixed to at least one face of said substrate member. Such magnetizable composition comprises a dispersion of the magnetizable product of this invention in an organic resin. The conventional techniques well known to those skilled in the art may be used for the preparation of such magnetic recording media.

Typically and preferably such a magnetic recording medium containing a magnetizable product of this invention is one wherein the substrate member is a flexible organic polymeric film. In a more preferred embodiment, such film is a polyester, such as a polyethylene terephthalate, but any desired conventional such film may be used.

Typically and preferably such a magnetic recording medium employs as the organic resin used in the dispersion at least one material selected from the group consisting of epoxides, polyamides, modified polyimides, polyurethanes, polyethers, and polyesters.

As used in this invention, the term "hemoglobin" has reference to the respiratory protein of red blood cells having the approximate formula (molecular weight about 65,000) (see $_{738}H_{1,186}Fe$ in $_{208}S_2(4)$). Similarly, for purposes of the present invention, the term "Albumin" has reference to the group of proteins which are soluble in water, in dilute salt solutions, and in 50% saturated ammonium sulfate, such group of proteins being present in extracts obtained from various sources such as mammalian tissues, bacteria, molds, plants, and food stuffs such as eggs and milk.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification.

COMPARATIVE EXAMPLE 1

| Cobalt sulfate . 7 hydrates $CoSO_4 . 7H_2O$ | 13.4 g |
| --- | --- |
| Sodium hypophosphite $NaH_2PO_2 . H_2O$ | 20.0 g |
| Sodium citrate $Na_3C_6H_5O_7 . 2H_2O$ | 30.0 g |
| Boric acid $H_3BO_3$ | 15.0 g |

The above reagents are dissolved in about 900 ml of distilled water, 8 ml of a palladium chloride $PdCl_2$ (1 g/l) solution is added to the resulting solution, the pH of the mixture solution is adjusted to 8.5 by addition of a sodium hydroxide NaOH solution (400 g/l). Then sufficient distilled water is added to the mixture solution to obtain 1 l of a reagent solution.

The above reagent solution is heated to cause a reaction to occur substantially at its boiling point, resulting in the production of black precipitates. These precipitates are separated and rinsed with distilled water and then are air dried at a temperature below 60° C. Cobalt fine particles thus obtained assume such an arrangement as shown in the electron micrograph of FIG. 1. These cobalt fine particles are not uniformly dispersed, and, according to X-ray diffraction measurements, they have a hexagonal system structure.

Figure 5:
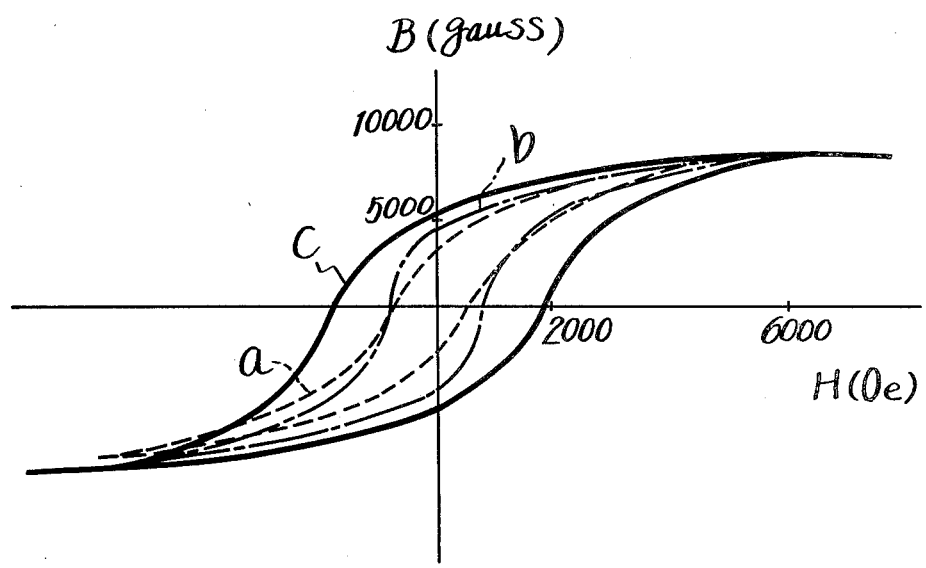
FIG. 5 shows B-H curves of cobalt particles shown in the preceding Figures.

The curve a in FIG. 5 is a B-H curve of these cobalt particles.

COMPARATIVE EXAMPLE 2

| Cobalt sulfate . 7 hydrate $CoSO_4 . 7H_2O$ | 13.4 g |
| --- | --- |
| Sodium hypophosphite $NaH_2PO_2 . H_2O$ | 20.0 g |
| Sodium citrate $Na_3C_6H_5O_7 . 2H_2O$ | 30.0 g |
| Boric acid $H_3BO_3$ | 15.0 g |
| Gelatin | 4.0 g |

After dissolving the above reagents in about 900 ml of distilled water, 8 ml of a palladium chloride $PdCl_2$ (1 g/l) solution is added to the above solution and the pH of the mixture solution is adjusted to 8.5 by addition of a sodium hydroxide aqueous solution (400 g/l). Then sufficient distilled water is added to the mixture solution to obtain 1 liter of a reagent solution.

Figure 2:

The above reagent solution is heated to cause a reaction to occur substantially at its boiling point for 30 minutes resulting in the production of a black magnetic powder precipitate. This magnetic powder precipitate is separated, rinsed in distilled water, and then air dried at a temperature below 60° C. An examination under an electron microscope (of one hundred thousand magnification) shows that cobalt fine particles assume an organized arrangement of a chain or string of beads as shown in FIG. 2, and that the individual particle size is 500 Å. These cobalt particles are well dispersed as compared with those shown in FIG. 1. Further, X-ray diffraction measurement reveals that the cobalt fine particles have a hexagonal system structure. The curve b in FIG. 5 is a B-H curve of these cobalt particles. It appears from this curve that the coercive force and the squareness ratio of the above cobalt particles are each improved as compared with these same respective properties in the cobalt particles prepared without using gelatin as taught in Comparative Example 1.

COMPARATIVE EXAMPLE 3

| Cobalt sulfate . 7 hydrates $CoSO_4 . 7H_2O$ | 13.4 g |
| --- | --- |
| Sodium hypophosphite $NaH_2PO_2 . H_2O$ | 20.0 g |
| Sodium citrate $Na_3C_6H_5O_7 . 2H_2O$ | 30.0 g |
| Boric acid $H_5BO_3$ | 15.0 g |
| Gelatin | 7.0 g |

After dissolving the above reagents in about 900 ml of distilled water, 10 ml of a palladium chloride $PdCl_2$ (1 g/l) solution is added to the above mixture solution and the pH of the mixture solution is adjusted to 8.5 by addition of sodium hydroxide solution (400 g/l). Then sufficient distilled water is added to the resulting solution to obtain 1 liter of reagent solution.

Figure 3:
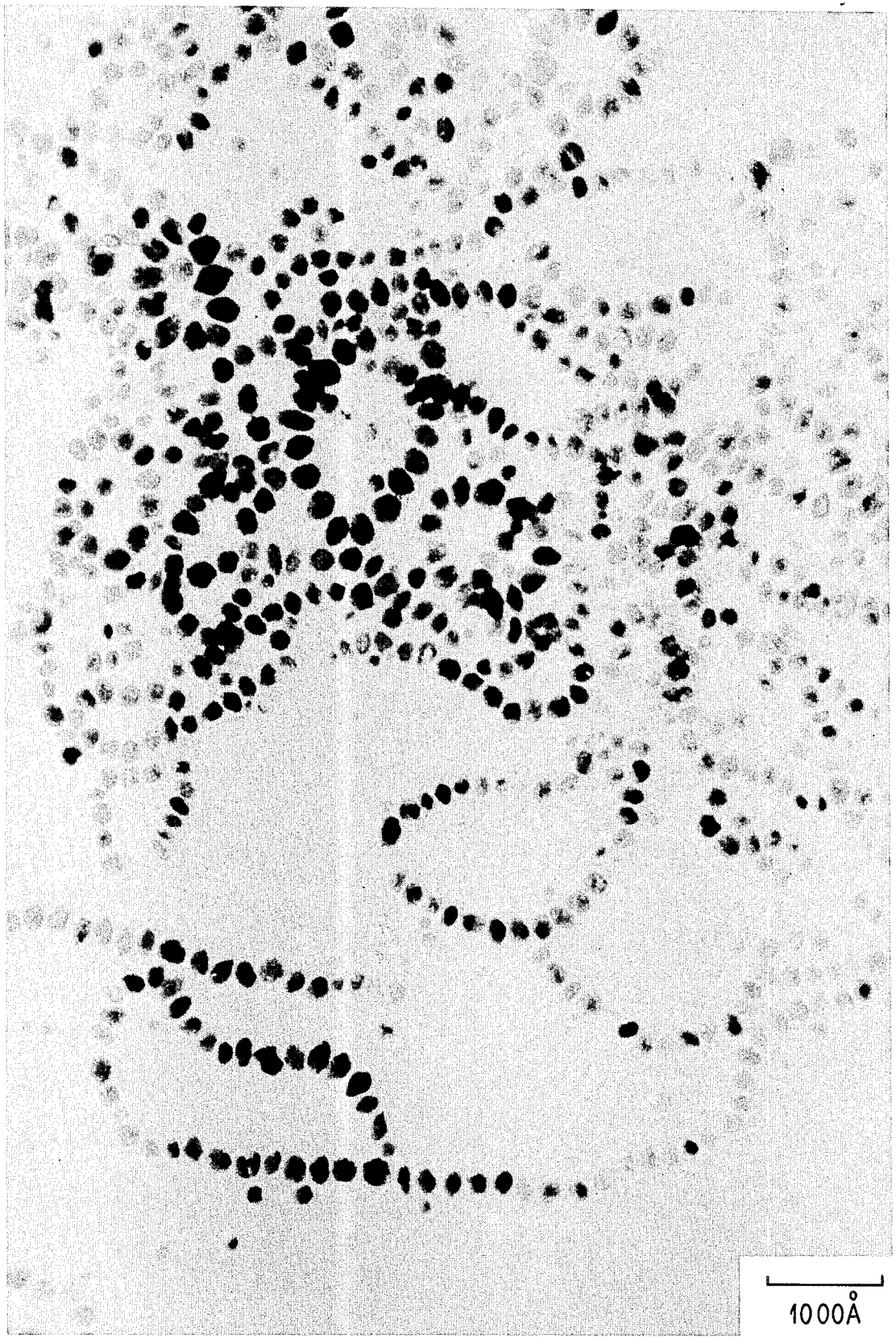

The above reagent solution is heated to cause a reaction to occur substantially at its boiling point for about one hour, resulting in the production of a black colloidal magnetic powder precipitate. This powder precipitate is treated as in the Comparative Example 2. Under the electron microscope, the cobalt fine particles thus obtained have a uniform particle size of 300 to 400 Å and assume an organized arrangement of a chain of beads as shown in FIG. 3. A comparison of this Example with Comparative Example 2 indicates that this dispersion of the particles is better than that in Comparative Example 2. The curve c in FIG. 5 is a B-H curve of the cobalt fine powder of this Example.

COMPARATIVE EXAMPLE 4

| Cobalt chloride 6 hydrates $CoCl_2 . 6H_2O$ | 5.6 g |
| --- | --- |
| Sodium tartrate $Na_2C_4H_4O_6 . 2H_2O$ | 92.0 g |
| Gelatin | 10.0 g |

After dissolving the above reagents in about 900 ml of distilled water and adjusting the pH of the mixture solution to 12.2 by addition of sodium hydroxide NaOH solution (400 g/l), 50 ml of hydrazine hydrate (1000 g/l) and 7 ml of a palladium chloride $PdCl_2$ (1 g/l) solution are added to the above solution. Then sufficientdistilled water is added to the mixture solution to obtain 1 liter of a reagent solution.

By heating the above reagent solution to allow its reaction at 80° to 85° C. for one hour, a precipitate of black magnetic powder is obtained. This powder is treated as in Comparative Example 2. Under the electron microscope, the cobalt fine particles thus obtained are found to have assumed substantially the same organized arrangement of a chain of beads as shown in FIG. 3, and the particle size is 300–400 Å. (An electron micrograph of this powder is omitted). The B-H curve of this powder is substantially identical with the curve c in FIG. 5.

COMPARATIVE EXAMPLE 5

| Cobalt sulfate . 7 hydrates CoSO$_4$ . yH$_2$O | 26.8 g |
| Sodium hypophosphite NaH$_2$PO$_2$ . H$_2$O | 20.0 g |
| Boric acid H$_3$BO$_3$ | 30.0 g |
| Sodium citrate Na$_3$C$_6$H$_5$O$_7$ . 2H$_2$O | 15.0 g |
| Gelatin | 27.0 g |

Figure 4:
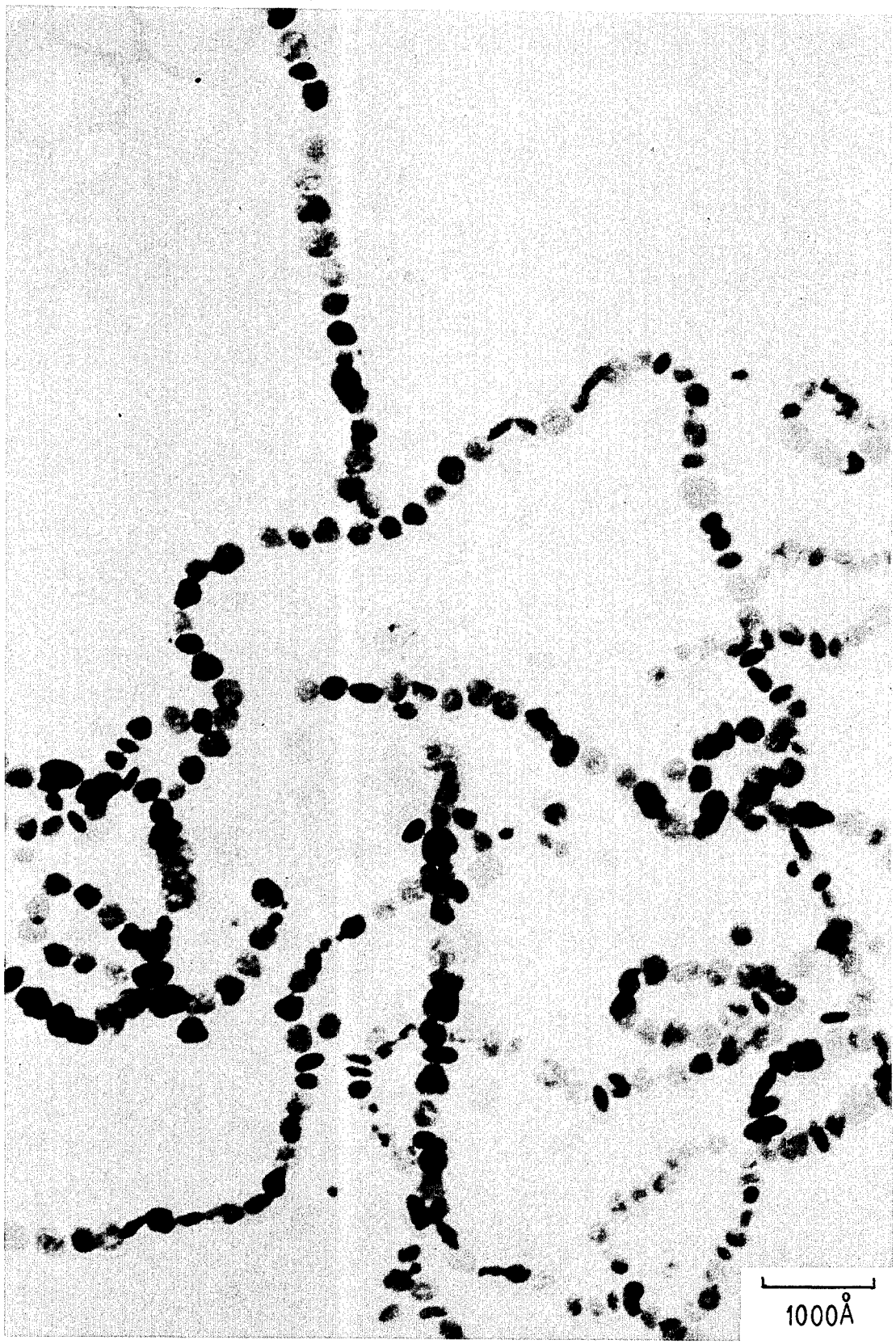

After dissolving the above reagents in about 900 ml of distilled water, 50 ml of a palladium chloride PdCl$_2$ (1 g/l) is added to the above solution and its pH is adjusted to 8.5 by addition of sodium hydroxide NaOH solution (400 g/l). Then, sufficient distilled water is added to the mixture solution to obtain 1 liter of a reagent solution. By treating the reagent solution as in Comparative Example 2, cobalt fine particles are obtained. The particle size is 300 to 400 Å. FIG. 4 is an electron micrograph of the cobalt fine particles of this Comparative Example. The B-H curve of these particles is substantially identical with the curve c in FIG. 5.

Now, Examples are given in which proteose, proteose peptone, and SPLG, which are each water soluble, are further added as protein.

COMPARATIVE EXAMPLE 6

| Cobalt sulfate . 7 hydrates CoSO$_4$ . 7H$_2$O | 14.0 g |
| Sodium hypophosphite NaH$_2$PO$_2$ . H$_2$O | 20.0 g |
| Sodium citrate Na$_3$C$_6$H$_5$O$_7$ . 2H$_2$O | 30.0 g |
| Boric acid H$_3$BO$_3$ | 15.0 g |
| SPLG | 0.5 g |

Figure 6:
FIGS. 6 through 8, are each an electron micrograph of cobalt particles obtained by methods not part of this invention prepared by adding water soluble protein in accordance with this invention.

The preparation of solution is achieved in the same manner as in Comparative Example 1 except that 3 ml of palladium chloride PdCl$_2$ (1 g/l) are added. By heating the resulting reagent solution to allow reaction substantially at its boiling point for 30 minutes, a black magnetic fine powder precipitate is obtained. This fine powder precipitate is separated, rinsed and dried in forced air at a temperature below 60° C. FIG. 6 is an electron micrograph of cobalt fine particles thus obtained. As is apparent from this electron micrograph, the cobalt fine particles are discrete and in the apparent form of droplet. These cobalt fine particles are remarkably uniform in size and small in particle size as compared with the particles obtained with the Comparative Example shown in FIG. 1. The particle size of the cobalt fine particles of this Example is about 500 Å. Further, X-ray diffraction reveals that the cobalt fine particles of this Example have the hexagonal system structure.

Respective cobalt fine particles batches, prepared by adding to the starting composition used in this Example in amounts of 1 g, 3 g, 5 g, 10 g and 20 g, respectively, of SPLG, are each uniform in particle size, in the apparent form of fine droplets, and have the hexagonal system crystal structure similar to the first case in this Example wherein 0.5 g of SPLG is added. The B-H curve of the cobalt fine particles obtained by adding 10 g of SPLG was substantially identical with the curve a in FIG. 5. The magnetic characteristics of the respective particle batches obtained by thus adding 0.5 g, 1.0 g, 3.0 g, 5.0 g, 10.0 g, and 20.0 g of SPLG to the starting composition are as given in the following Table I.

Table I

| Content of SPLG (g/l) | Saturated magnetism Bs (gauss) | Coercive force Hc (Oersted) | Sqaureness Ratio Br/Bs |
|---|---|---|---|
| 0.5 | 3320 | 1350 | 0.51 |
| 1.0 | 5510 | 1350 | 0.46 |
| 3.0 | 8900 | 1430 | 0.51 |
| 5.0 | 7075 | 1380 | 0.50 |
| 10.0 | 9600 | 1400 | 0.50 |
| 20.0 | 10400 | 1470 | 0.51 |

COMPARATIVE EXAMPLE 7

| Cobalt sulfate . 7 hydrates CoSO$_4$ . 7H$_2$O | 14.0 g |
| Sodium hypophosphite NaH$_2$PO$_2$ . H$_2$O | 20.0 g |
| Sodium citrate Na$_3$C$_6$H$_5$O$_7$ . 2H$_2$O | 30.0 g |
| Boric acid H$_3$BO$_3$ | 15.0 g |
| Peptone | 10.0 g |

Figure 7:

The above reagents are treated as in Comparative Example 6, but, in this case, 40 ml of palladium chloride PdCl$_2$ (1 g/l) is added. The reaction and collection methods are exactly the same as in Comparative Example 1 and in Comparative Example 2, respectively. FIG. 7 is an electron micrograph of cobalt fine particles thus obtained. As is apparent from this, the cobalt fine particles have a highly uniform particle size of about 200 Å, assume an organized arrangement of a chain of beads, and are well dispersed. Further, it is ascertained by X-ray diffraction that these fine particles have the hexagonal system structure. The B-H curve of this cobalt fine powder is substantially identical with the curve b in FIG. 5.

COMPARATIVE EXAMPLE 8

Figure 8:
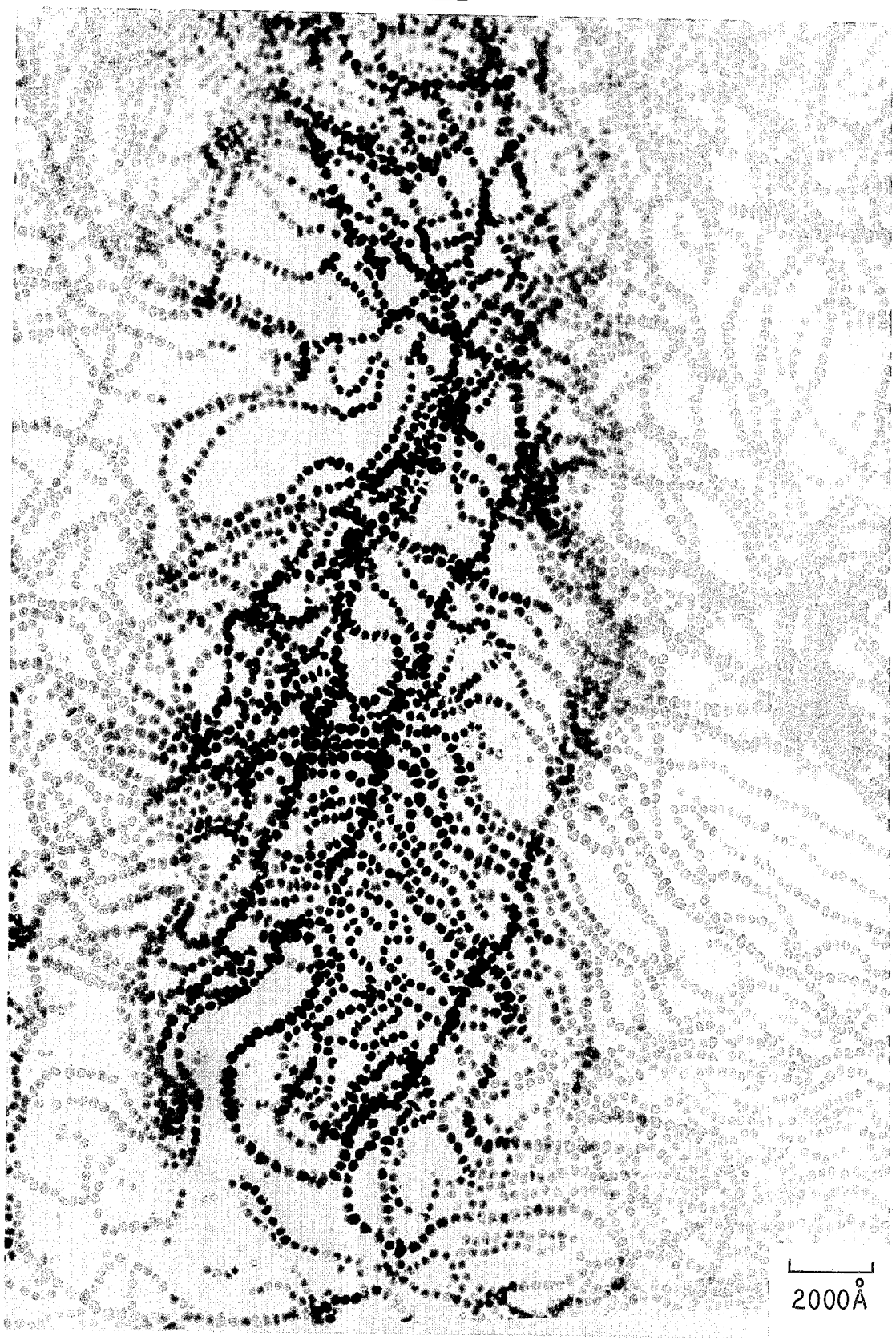

This Example is effected in exactly the same manner as the above Comparative Example 7 except that the amount of peptone in the composition of the reagents in Comparative Example 7 is reduced from 10 g to 1 g. FIG. 8 is an electron micrograph of cobalt fine particles thus obtained. Substantially no change in the particles is observed as compared with the particles of Comparative Example 7 as shown in the electron micrograph of FIG. 7.

Further, as the additives, that is, as water soluble proteins, metaprotein, proteose, proteose peptone, or the like, can be employed.

COMPARATIVE EXAMPLE 9

| Casein | 1.0 g |
| Boric acid H$_3$BO$_3$ | 15.0 g |
| Sodium citrate Na$_3$C$_6$H$_5$O$_7$ . 2H$_2$O | 30.0 g |
| Sodium hypophosphite NaH$_2$PO$_2$ . H$_2$O | 20.0 g |

| | |
|---|---|
| Cobalt sulfate<br>$CoSO_4 \cdot yH_2O$ | 13.2 g |

Figure 11:
FIGS. 11 through 13 are each an electron micrograph of magnetic particles prepared by methods not part of this invention.

The above reagents are dissolved in 900 ml of distilled water and a reagent solution is prepared in the same manner as in Comparative Example 3. A permanent magnet is placed in the reagent solution and the solution is heated up to 80° C. and 15 ml of palladium chloride $PdCl_2$ (1 g/l solution) is added to the heated reagent solution to be allowed to perform reducing reaction, by which cobalt fine particles are precipitated. The particles are recovered and dried generally as taught in Comparative Example 2. FIG. 11 is an electron micrograph of the cobalt fine particles obtained in this Example. The particles are spherical and have a uniform size from 300 to 350 Å and extend in adjacent relationship in a continuous fibriform manner. The coercive force of this fine powder is 1420 Oersteds.

COMPARATIVE EXAMPLE 10

Figure 12:

2 g of Keratin are added to 500 ml of distilled water made alkaline by dissolved sodium hydroxide NaOH dissolution being accomplished with heating. A reagent solution is prepared by achieving the subsequent steps following those in Comparative Example 2 except that the pH is adjusted to 8.5. A permanent magnet is placed in this reagent solution and the solution is heated. When the reagent solution begins to boil, 134 ml of palladium chloride $PdCl_2$ (a 1 g/l solution, are added to the solution to cause a reducing reaction, whereby cobalt particles are precipitated. The particles are recovered and dried generally as taught in Comparative Example 2. FIG. 12 is an electron micrograph of the cobalt particles obtained in this Comparative Example. The particles are spherical and have a uniform size of about 700 Å. The coercive force of this powder is 680 Oersteds.

Cobalt fine particles of a uniform particle size can be produced even if no magnetic field is used.

In the foregoing Comparative Example, palladium chloride $PdCl_2$ is used as a catalyst, so that dehydrating reaction of hypophosphite ions $H_2PO_2{-}$ is caused by $Pd++$ of $PdCl_2$ serving as a catalyst to produce nascent hydrogen, by which the above metal is reduced and precipitated. Further, at the same time, the hypophosphite ions $H_2PO_2{-}$ are reduced by the nascent hydrogen to produce elemental phosphorus as expressed by the following reaction equation:

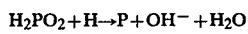

$$H_2PO_2 + H \rightarrow P + OH^- + H_2O$$

Therefore, particles reduced by sodium hypophosphite $NaH_2PO_2 \cdot H_2O$ contain several weight percent of phosphorus. The presence of phosphorus in the particles introduces such disadvantages as lowering of crystallinity of the particles, and, consequently, lowering of the magnetic properties, such as saturated magnetic flux density, and so on. The following description is made with regard to a method of obtaining ferromagnetic fine particles which are free from the above defects and have excellent magnetic properties.

The method of making the magnetic powder in this case is featured in the use of hydrazine hydrate $N_2H_4 \cdot H_2O$, hydrazine chloride $N_2H_4 \cdot 2Cl$, hydrazine sulfate $N_2H_4 \cdot H_2SO_4$, etc. as reducing agents. This is based on the following reaction equation:

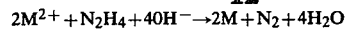

$$2M^{2+} + N_2H_4 + 4OH^- \rightarrow 2M + N_2 + 4H_2O$$

As expressed by the above equation, it is possible to avoid mixing of non-magnetic substances, such as P and the like, in the precipitated particles.

COMPARATIVE EXAMPLE 11

| | |
|---|---|
| Cobalt sulfate (7 hydrates)<br>$CoSO_4 \cdot 7H_2O$ | 14 g/l |
| Hydrazine sulfate<br>$N_2H_4 \cdot H_2SO_4$ | 60 g/l |
| Sodium tartrate<br>$Na_2C_4H_4O_6 \cdot 2H_2O$ | 50 g/l |
| Gelatin | 7 g/l |

Figure 13:

The above reagents are dissolved in distilled water to obtain 1l of a solution, the pH of which is adjusted in preparation to obtain 1l of a solution, the pH of which is adjusted in preparation to 12.3 by adding a sodium hydroxide NaOH solution (400 g/l). The resulting solution is used as a reagent solution. A permanent magnet (800 gausses) is immersed in the reagent solution and the solution is heated up to 90° to 100° C. Then there is added 5 ml of a palladium chloride $PdCl_2$ solution (1 g/l) and a reduction reaction is caused which produces a precipitate. Particles precipitated are attracted and collected by the permanent magnet. The particles thus obtained are rinsed with hot water of 70° to 80° C. and air dried at a temperature below 50° C. FIG. 13 is an electron micrograph of the particles thus produced. The particle size is 300 to 500 Å.

For the purpose of comparison with the above Comparative Example, a description is given of an example which employed, as a reducing agent, sodium hypophosphite $NaH_2PO_2 \cdot H_2O$ together with hydrazine sulfate $N_2H_4 \cdot H_2SO_4$.

COMPARATIVE EXAMPLE 12

| | |
|---|---|
| Cobalt sulfate (7 hydrates)<br>$CoSO_4 \cdot 7H_2O$ | 14 g/l |
| Hydrazine sulfate<br>$N_2H_4 \cdot H_2SO_4$ | 60 g/l |
| Sodium hypophosphite<br>$NaH_2PO_2 \cdot H_2O$ | |
| Sodium tartrate<br>$Na_2C_4H_4O_6 \cdot 2H_2O$ | 50 g/l |
| Gelatin | 7 g/l |

In this Comparative Example, the above materials are formed into 1l if a reagent solution in the manner of Comparative Example 11 and a reagent solution as employed in Comparative Example 11 is used. The total amount of the reducing agents employed is determined to be 60 g/l. A reduction reaction is achieved in the manner of Comparative Example 11 except that, during the reaction, the weight percentage of hydrazine sulfate $N_2H_4 \cdot H_2SO_4$ relative to sodium hypophosphite $NaH_2PO_2 \cdot H_2O$ is changed in a stairstep (incremental) manner. Particles precipitated are collected in exactly the same manner as in Comparative Example 11.

Figure 14:
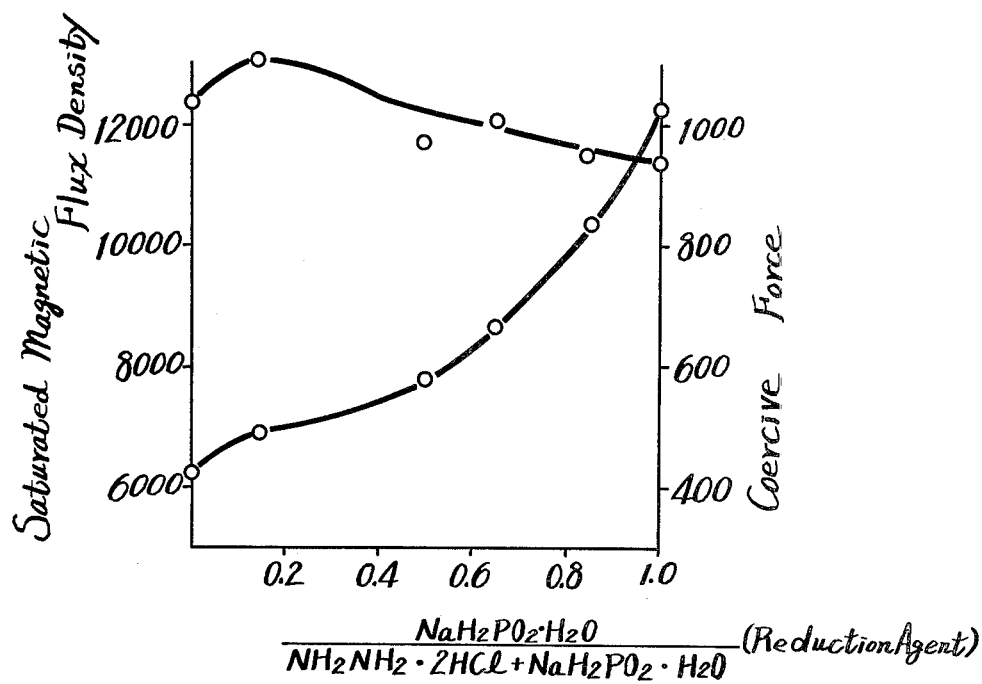
FIG. 14 is a graph showing the relationship between the percentage by weight of hydrazine sulfate to sodium hypophosphate and the magnetic properties (saturation magnetic flux density $B_s$ and coercive force $H_c$) of certain magnetic particles prepared by using them as reducing agents.

Next, the relationships between the weight percentage of the both reducing agent and the magnetic characteristics (saturated magnetic flux density Bs and coercive force Hc) of the particles obtained are determined and the results are shown in FIG. 14. Further, the amounts of phosphorus contained in the respective particles are determined by a fluorescence X-ray analyser and the relationships between the amount of phosphorous and the weight percentage of both reducing agents (hydrazine sulfate $N_2H_4SO_4$ and sodium hypophosphite $NaH_2PO_2.2H_2O$) are shown in FIG. 15.

Figure 15:
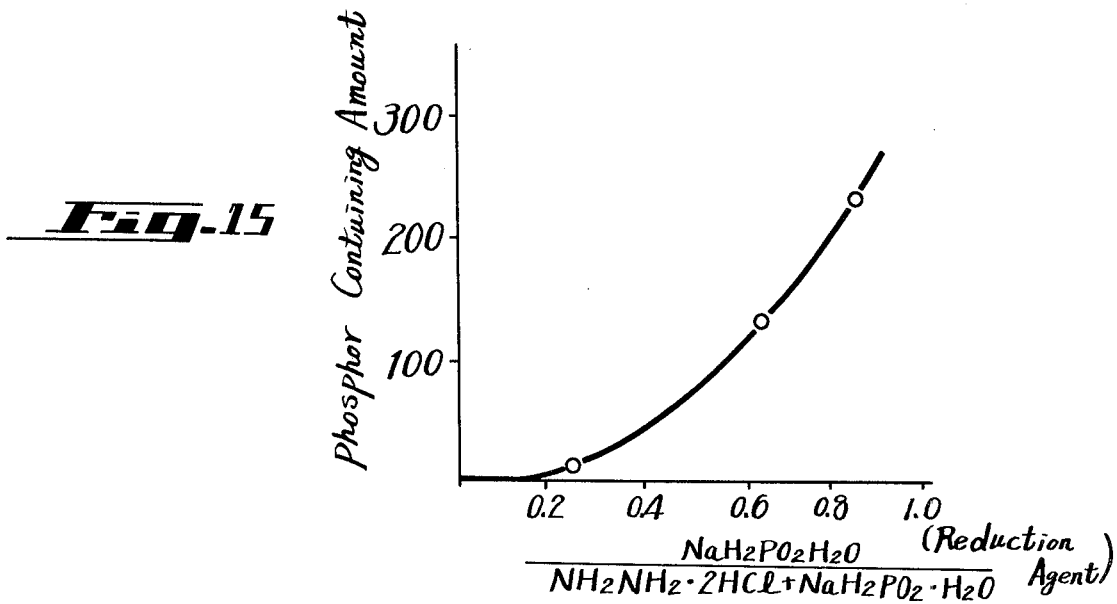
FIG. 15 is a graph showing the relationship between the percentage by weight of such reducing agents and the phosphorus content of magnetic particles obtained.

As is evident from FIGS. 14 and 15, the magnetic properties of the particles are dependent upon the content of phosphorus in the particles. Thus, an increase in the content of phosphorus causes a decrease in the saturated magnetic flux density Bs and an increase in the coercive force Hc.

In the above Comparative Example, a solution containing hydrazine sulfate $N_2H_4.H_2SO_4$ and cobalt ions $Co^{++}$ is used but the same results are also obtained with a solution using, for example, a mixture of hydrazine hydrochloride $N_2H_4.2HCl$ and hydrazine hydrate $N_2H_4.H_2O$ as reducing agents.

By using hydrazines as reducing agents, it is possible to obtain cobalt and cobalt alloy fine particles which have excellent magnetic properties, in particular, high saturated magnetic flux density Bs, as compared with those obtained by using sodium hypophosphite $NaH_2.PO_2.H_2O$. Further, these individual particles assume a fibriform arrangement, as shown in FIG. 13, and have a kind of configuration anisotropy. Accordingly, the use of hydrazines as reducing agents is of preferred utility for obtaining magnetic powder for use in the production of magnetic recording media in accord with the teachings of the present invention.

In the above Comparative Example, the particles are formed in an arrangement of a chain of beads and have gennerally excellent magnetic properties, but, as is apparent from an electron micrograph, each particle is discrete and slightly spaced apart from adjacent particles. Such a particle arrangement leads to unstable configuration anisotropy.

Now, another Comparative Example is described in which sodium carboxymethyl cellulose is added to improve the squareness ratio in the tape orientation for the purpose of adhering the fine particles to provide for increased configuration anisotropy. This example is featured in that, by performing the reducing reaction by adding sodium carboxymethyl-cellulose to a mixture solution containing metal salts, such as cobalt ions and the like; and a reducing agent for reducing palladium chloride and the like, and a reducing agent for reducing palladium chloride and the like, metal fine particles are uniformly grown. Even by changing the concentration dependency of sodium carboxylmethyl cellulose based on 1l of distilled water in the range of from about 0.05 to 10.0 g, the configuration and the magnetic properties of the particles respectively are not deteriorated but held uniform. Further, a metallic ion supply source can be selected from various metal salts, such as chloride, bromide, sulfate, sulfamate, etc.

To facilitate a better understanding of this example, a description will be given first of an example using gelatin for comparison with this example.

COMPARATIVE EXAMPLE 13

| | |
|---|---|
| Cobalt sulfate $CoSO_4.7H_2O$ | 8.0 g |
| Nickel sulfate $NiSO_4.7H_2O$ | 5.0 g |
| Sodium citrate $Na_3C_6H_5O_7.2H_2O$ | 30.0 g |
| Sodium hypophosphite $NaH_2PO_2.H_2O$ | 20.0 g |
| Boric acid $H_3BO_3$ | 15.0 g |
| Gelatin | 4.0 g |

Figure 16:
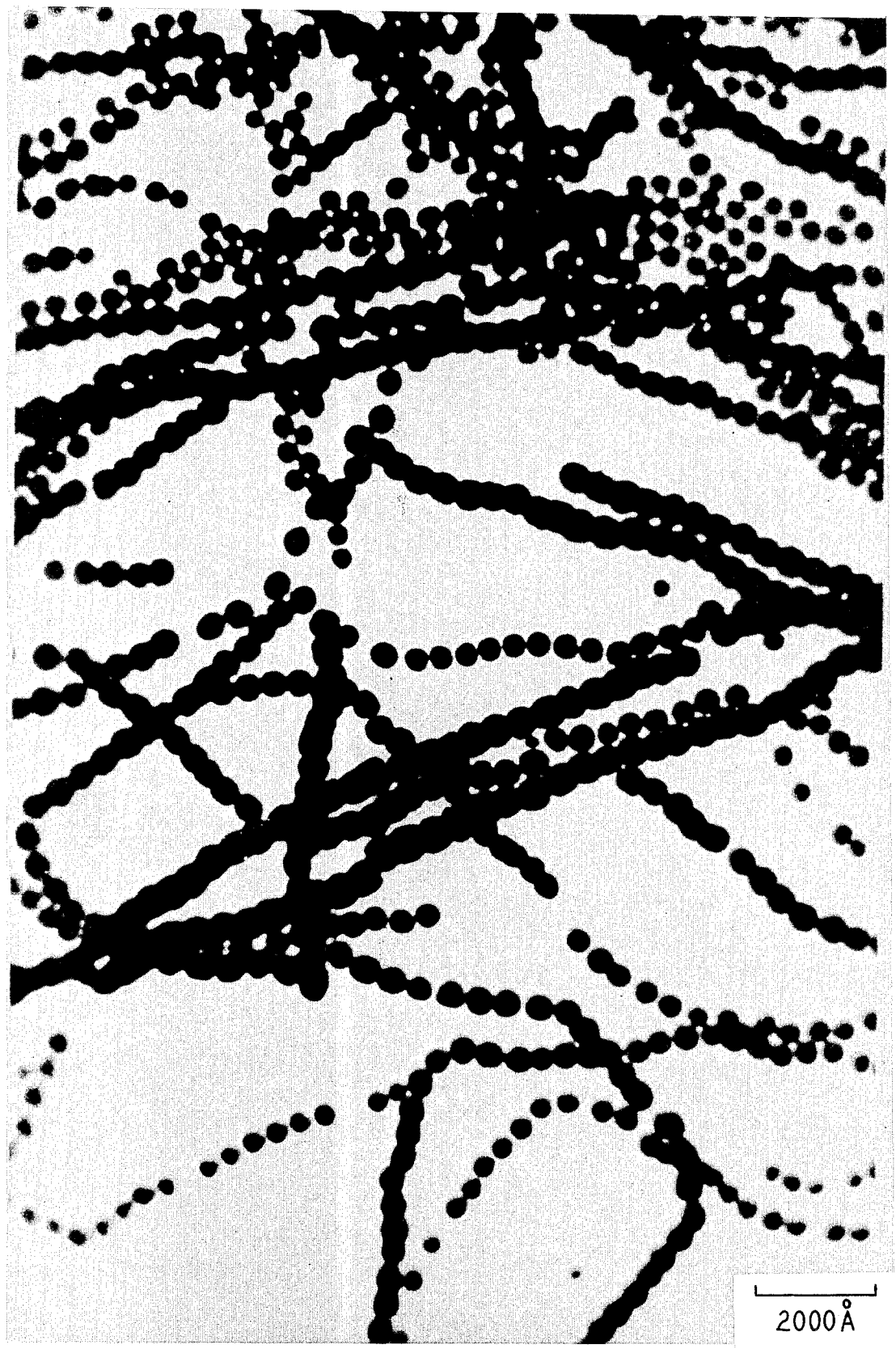
FIGS. 16 and 17 are each an electron micrograph of magnetic particles prepared by methods not part of this invention.

A reagent of the above composition is dissolved in about 900 ml of distilled water and 1 ml of palladium chloride $PdCl_2$ (1 g/l solution) is added to the solution. Then sufficient distilled water is added to obtain substantially 1l of solution, the pH of this mixture solution having been first adjusted to 8.5 with a sodium hydroxide solution (400 g/l). This product solution serves as a sample solution. By heating this solution to cause reaction at a temperature above 70° C., a black precipitate is obtained. The black precipitate is separated, collected, and rinsed with distilled water, and is air dried at a temperature below 60° C. FIG. 16 is an electron micrograph of the cobalt-nickel alloy particles thus obtained. These cobalt-nickel alloy particles have the physical appearance of water drops and have a particle size of 300 to 400 Å. Their magnetic properties have such values as given in the following Table II as number 1.

Table II

| No. | Amount of sodium carboxymethyl cellulose (g/l) | Saturated magnetism Bs (gauss) | Coercive force Hc (Oersted) | Squareness ratio Br/Bm |
|---|---|---|---|---|
| I | 0 | 8.720 | 660 | 0.51 |
| II | 0.05 | 8.840 | 580 | 0.50 |
| III | 1.00 | 8.650 | 680 | 0.48 |
| IV | 2.00 | 8.530 | 710 | 0.51 |
| V | 4.00 | 7.500 | 800 | 0.47 |
| VI | 10.00 | 7.550 | 770 | 0.48 |

Figure 18:
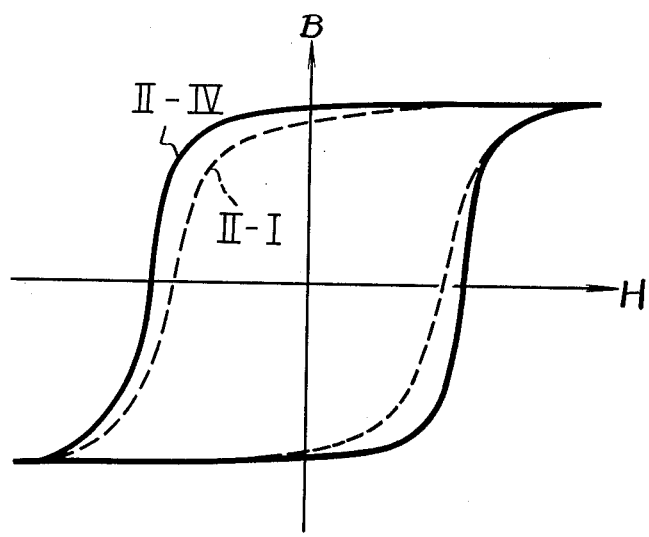
FIG. 18 is a graph showing B-H curves of magnetic particles prepared by adding sodium carboxymethyl cellulose and those prepared without adding it.

After the cobalt-nickel alloy particles are dispersed by ultrasonic waves in a solvent together with a binder, the resultant dispersion is coated on a polyester film and oriented in a magnetic field of 4000 gauss. The B-H curve of the resulting magnetic recording medium is shown in dotted line (II-I) in FIG. 18.

COMPARATIVE EXAMPLE 14

| | |
|---|---|
| Cobalt sulfate $CoSO_4.7H_2O$ | 8.0 g |
| Nickel sulfate $NiSO_4.7H_2O$ | 5.0 g |
| Sodium citrate $Na_3C_6H_5O_7.2H_2O$ | 30.0 g |
| Sodium hypophosphite $NaH_2PO_2.H_2O$ | 20.0 g |
| Boric acid $H_3BO_3$ | 15.0 g |
| Gelatin | 4.0 g |
| Sodium carboxylmethyl cellulose | 2.0 g |

A solution is prepared in the same manner as in the above Comparative Example 13 and black magnetic particles are similarly obtained by heated reaction. The particles produced are separated, rinsed, and air dried at a temperature below 60° C.

Figure 17:

An electron micrograph of the resulted cobalt-nickel particles is shown in FIG. 17. As is evident from this, the cobalt-nickel particles, though chained and discrete in the above Comparative Example 14 here appear to be in the form of nondiscrete rods. The width of an individual rod is in the range of 400 to 500 Å.

A series of cobalt-nickel fine particles is produced each being obtained from the same starting composition using the same procedure as in the above Example except that the amount of sodium carboxylmethyl cellulose added to each respective such starting composition is 0.05 g/l, 1 g/l, 4 g/l, and 10 g/l. Each particle product is in the form of uniform and nondiscrete rods, such as is the case with that obtained in the above Example and shown in FIG. 17. The magnetic properties of these particle products so obtained by adding sodium carboxylmethyl cellulose in such respective amounts of 0.05 g/l to 10 g/l are shown in Table II as numbers II through VI.

These fine particles are dispersed by ultrasonic waves in a solvent and binder system as in Example 2 and the resulting dispersions are each coated on a polyester film and oriented in a magnetic field of 4000 gausses. The B-H curves of the resulting magnetic recording media are shown by curves II through IV in FIG. 18.

These B-H curves indicate that the awareness ratio of the particles when coated on the tape is more excellent than that obtainable in Comparative Example 13 and that the coercive force Hc is also high. The magnetic properties of the particles when incorporated into magnetic tape media are improved as compared with those particles similarly incorporated which do not have added sodium carboxylmethyl cellulose.

While the above Example employed a solution containing cobalt and nickel ions, the same or equivalent results can also be obtained by using a solution containing other metallic ions mixed with cobalt ions, for example, iron ions $Fe^{++}$ in combination with cobalt ions $Co^{++}$.

According to the above Comparative Example 14, particles of uniform size and in the form of nondiscrete rods are obtained and they are excellent in such magnetic properties as squareness ratio, coercive force, etc., and such particles are of great utility for use in magnetic recording media.

In each of the foregoing comparative examples, gelatin, peptone, or like water soluble protein is incorporated. Such a protein has a characteristic regular, cubic network structure and metallic ions are uniformly captured in such a network structure, and when so captured, serve as nuclei for the growth of magnetic particles, and the particles of a group so grown or developed are characteristically uniform in particle size.

However, the metal particles or alloy particles obtained by the foregoing method are uniform in particle size but several to dozens of particles are linked in the form of a loop, so that orientation of the particles by a magnetic field is difficult.

Thus, where gelatin is used as the water soluble protein as described above, the resulting particle size is in the range of 300 to 400 Å and the particles of this size are single-domain particles. If the reducing reaction is achieved in the absence of a magnetic field, the magnetic particles take a form of small magnetic energy, that is, assume an arrangement of a chain in the form of a closed loop. This results in such a defect that, when these particles are incorporated into magnetic recording media, their excellent magnetic properties cannot be effectively exhibited.

Now, a description is given of a method of making ferromagnetic metal particles or ferromagnetic alloy particles which are substantially free from the above mentioned defect, uniform in particle size, excellent in magnetic properties and easy to arrange in the presence of a magnetic field. By achieving the reducing reaction in the presence of a magnetic field, the magnetic particles open the closed chains or loop and assume an organized arrangement resembling a chain of spheres extending along generally straight lines oriented towards the magnetic field. Accordingly, where the reducing reaction is effected in the presence of a magnetic field, particles are arranged in the form of chains, have large configuration anisotropy, and are easily arranged in a direction of the magnetic field. When the particles are subsequently incorporated into a magnetic recording media, their excellent magnetic properties can be fully exhibited.

Figure 19:
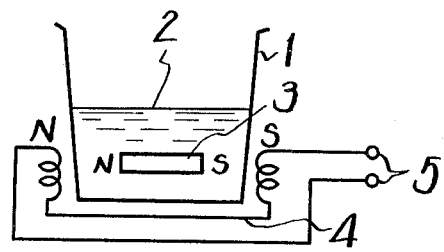
FIG. 19 is a schematic diagram illustrating magnetic field application for use in this invention.

The magnetic field is applied during the reducing reaction in the followng manner. Thus, as shown in FIG. 19, a bar magnet 3 is immersed in a solution 2 contained in a container 1 and fixed therein, and then the reducing reaction is carried out while stirring the solution 2. One can also position an electromagnet 4 around the container 1 and produce a magnetic field by applying thereto a predetermined current from terminals 5.

This method has such advantages as the fact that orientation of the magnetic particles is excellent, the fact that the saturated magnetic flux density can be controlled by the magnetic field, the fact that the magnetic flux density can be increased, and the fact that the tape squareness ratio can be enhanced.

These relationships are described in detail with regard to FIGS. 20 and 21. In FIG. 20, the ordinate represents the saturated magnetic flux density and the coercive force of the magnetic particles reduced in the presence of a magnetic field according to this invention, and the abscissa represents the intensity of the reaction magnetic field. The curves 6 and 7 indicate the saturated magnetic flux density and the coercive force, respectively. It appears from these curves that an increase in the intensity of the reaction magnetic field causes an increase in the magnetic flux density.

FIG. 21 is a graph showing squareness ratios obtained where particles produced by applying various reaction magnetic field during reduction are coated on polyester films in the presence of a certain magnetic field. This graph also indicated that the squareness ratio increases with an increase in the intensity of the reaction magnetic field.

Other examples of this invention are now described.

COMPARATIVE EXAMPLE 15

| | |
|---|---|
| Cobalt + Nickel $Co^{++} + Ni^{++}$ | 28.0 g |
| Sodium hypophosphite $NaH_2PO_2 \cdot H_2O$ | 20.0 g |
| Sodium citrate $Na_3C_6H_5O_7 \cdot 2H_2O$ | 30.0 g |
| Boric acid $H_3BO_3$ | 15.0 g |
| Gelatin | 7.0 g |

A reagent of the above composition is dissolved in about 1 l of distilled water and the pH of this mixture solution is adjusted to 8.5 and the distilled water is added to the mixture solution to obtain exactly 1 l of a reagent solution. This reagent solution is disposed between the poles of an electromagnet and the field intensity is selected to be 100 Oersteds. Thereafter, the solution is heated and, when it began to boil, 5 ml of a palladium chloride $PdCl_2$ solution (0.006 mol/l) is added to the solution to cause reducing reaction, by which a black cobalt-nickel alloy precipitate is obtained. This precipitate is separated, collected, rinsed with distilled water and air dried at a temperature below 60° C.

Figure 22:
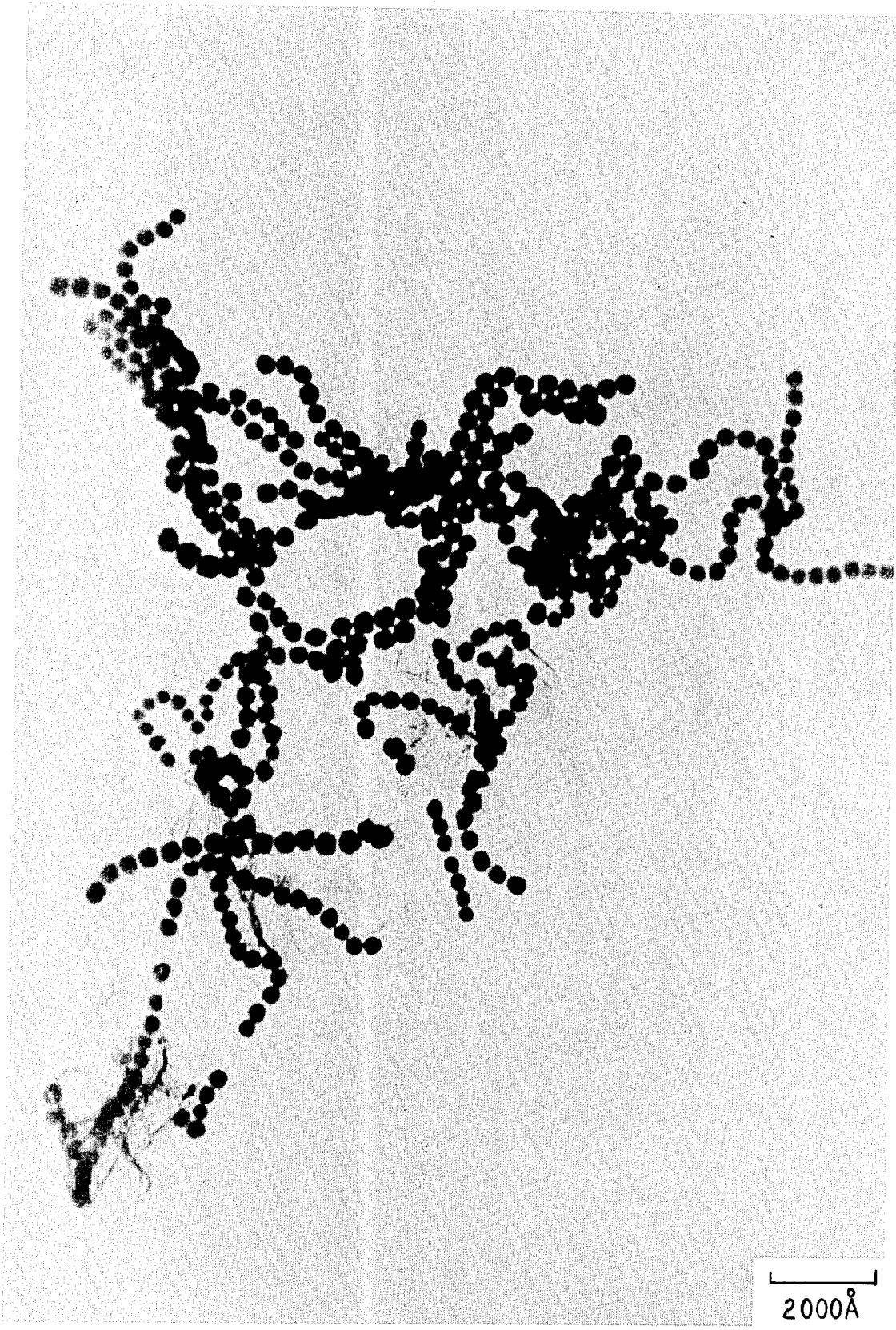
FIGS. 22, 23 and 24 are electron micrographs of magnetic particles prepared by methods not part of this invention.

An electron micrograph of the cobalt-nickel alloy particles thus obtained is shown in FIG. 22. From this micrograph, it appears that the particles obtained in this Example have a particle size of 300 to 400 Å which is the same as that in the case where the reducing reaction is achieved in the presence of a magnetic field as described above and that the chains of the particles are not circular but fibriform though bent. The saturated magnetic flux density of the particles, measured by a B-H loop tracer, was 7180 gausses.

COMPARATIVE EXAMPLE 16

Then, 10 g of particles obtained with this Comparative Example are mixed with 2 g of a binder (vinyl chloride resin, vinyl acetate resin, fiber element resin or ester resin) and 35 g of a solvent (a mixture solution of methyl ethyl ketone $CH_3COC_2H_5$ and toluene $C_6H_5CH_3$ in the ratio of 1:1) and the resulting mixture solution is mixed by an ultrasonic dispersing device for thorough dispersion of the particles in the binder and in the solvent. The resulting homogeneous solution is coated on a polyester film in a magnetic field of about 2000 Oersteds and dried. This tape is used as a sample tape. The squareness ratio of this tape, measured by a B-H loop tracer, was 0.55.

Figure 23:
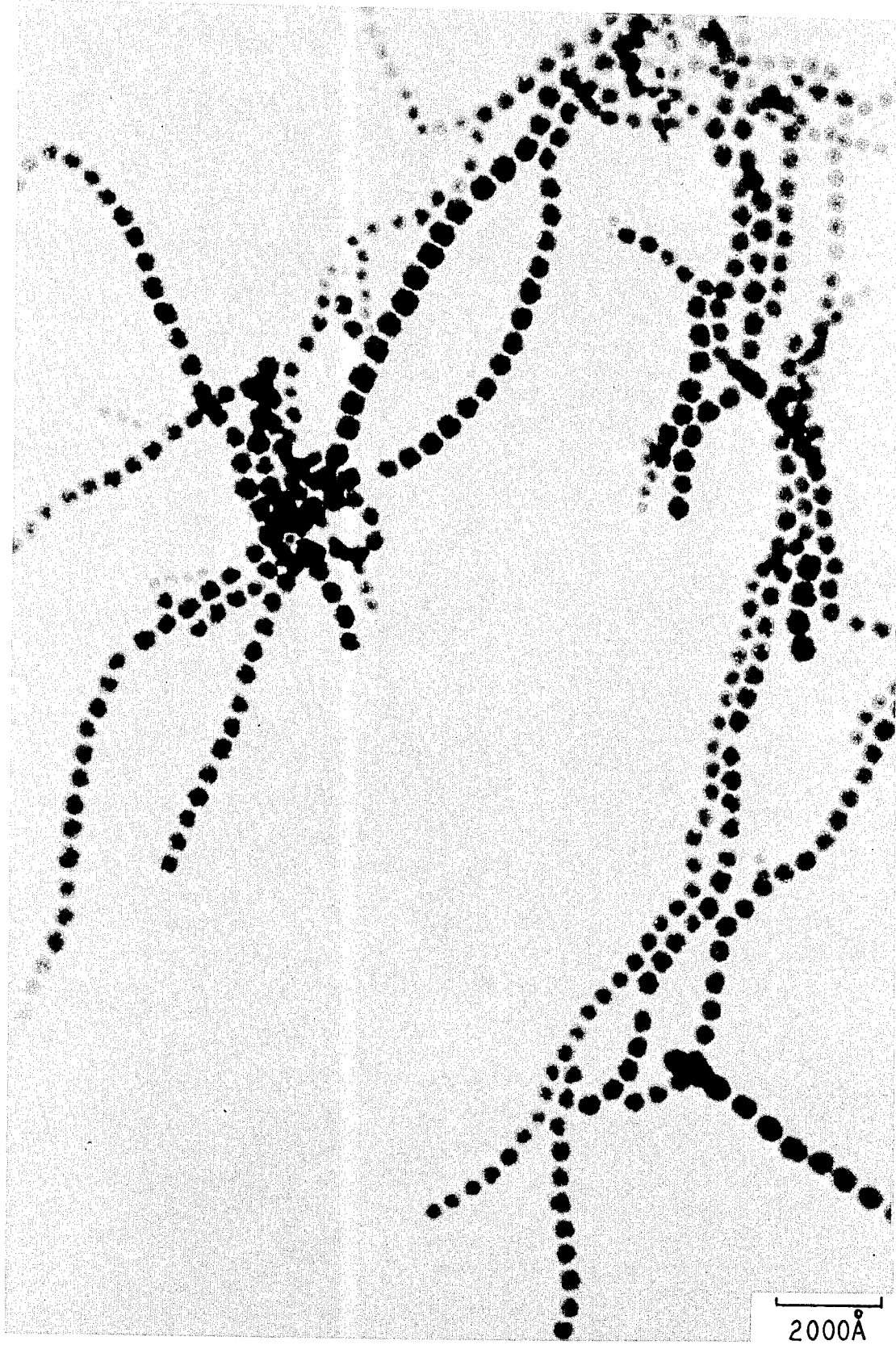

A reagent solution prepared by the same method as in the above Comparative Example 15 is placed in a magnetic field of 400 Oersteds and cobalt-nickel alloy particles are obtained by the same method as in Comparative Example 17. An electron micrograph of the particles is shown in FIG. 23. The particle size of the particles in this Comparative Example is 300 to 400 Å and no change is observed in the particle size as compared with those of the particles obtained in the absence of a magnetic field by the conventional method and the particles obtained with the foregoing Comparative Example 15. The electron micrograph shows that the claims formed by the particles are less curved than in the particles produced in Comparative Example 15 and that the number of particles forming one chain is larger than that in Comparative Example 15.

The saturated magnetic flux density of the particles obtained with this Example, measured by the same method as in Example 15, is 7400 gausses. Then, a sample tape is produced by using the particles in the same manner as in Comparative Example 15 and its squareness ratio, measured by the same method as in Comparative Example 15, was 0.80.

COMPARATIVE EXAMPLE 17

Figure 24:
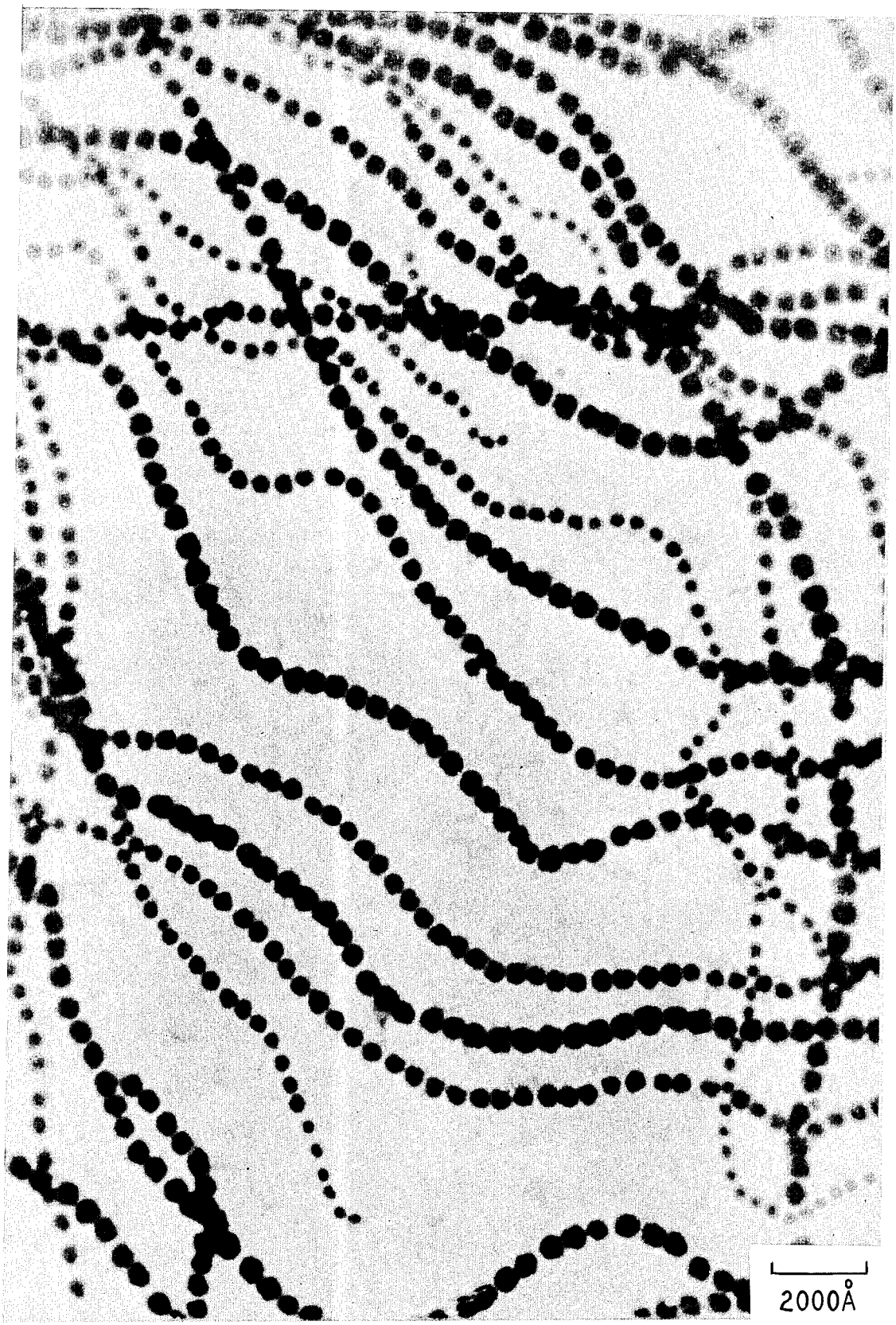

A reagent solution prepared by the same method as in Comparative Example 15 is placed in a magnetic field of 1000 Oersteds and cobalt-nickel alloy particles are obtained by the same method as in Comparative Example 15. An electron micrograph of the particles thus obtained is shown in FIG. 24. The particle size of the particles in this Comparative Example is 300 to 400 Å and no change is observed in the particle size as compared with that of the particles produced without applying a magnetic field. The chains formed by the particles are substantially straight and the number of particles forming one chain is further increased as compared with that in Comparative Example 15. The saturated magnetic flux density of the particles obtained with this Comparative Example, measured by the same method as in Comparative Example 15, is 7600 gausses.

A sample tape is produced by using the particles of this invention by the same method as in Comparative Example 15 and its squareness ratio, measured by the same method as in Comparative Example 15, as 0.84.

Although the present invention is described with regard to the case where the metal reduced by the reducing agent is a cobalt-nickel alloy, the invention is also applicable not only to the cobalt-nickel alloy but also to any metal units of cobalt, nickel and iron and alloys formed by these three kinds of metals or other metals which form magnetic alloys with these three kinds of metals. The results of a cobalt-iron alloy to which this invention is applied are shown in FIG. 25. The graph shows that the squareness ratio is substantially the same as that shown in FIG. 21.

EXAMPLE 1

Two grams of hemoglobin are added to 500 ml of distilled water made alkaline by dissolved sodium hydroxide NaOH, dissolution being accomplished with heating 15 g of boric acid, $H_3BO_3$, 30 g of sodium citrate, $Na_3C_6H_5O_7.2H_2O$, 20 g of sodium hypophosphite, $HaH_2PO_2.H_2O$, and 13.2 g of cobalt sulfate, $CoSO_4.7H_2O$ are dissolved in the above solution and the solution is cooled down to room temperature. Then, sufficient distilled water is added to obtain 900 ml of solution. After pH of the solution is adjusted to 9.5 by adding sodium hydroxide NaOH (a 400 g/l aqueous solution), distilled water is added to the mixture solution to obtain 1 liter of a reagent solution.

Figure 9:
FIGS. 9 and 10 are each an electron micrograph of magnetic particles prepared by the method of this invention.

A permanent magnet is placed in this reagent solution and the reagent solution is heated up to approximately its boiling point and 48 ml of palladium chloride $PdCl_2$ (1 g/l solution) are added to this reagent solution to allow it to undergo a reducing reaction, thus precipitating black cobalt particles which are recovered and dried generally as taught in Comparative Example 2. FIG. 9 is an electron micrograph of the cobalt fine particles obtained in this Example. The particles are spherical having a uniform size of 100 Å but extend in adjacent relationship in a continuous fibriform manner. The coercive force of the fine powder is 640 Oersteds.

EXAMPLE 2

| | |
|---|---|
| Albumin | 3.0 g |
| Boric acid $H_3BO_3$ | 15.0 g |
| Sodium citrate $Na_3C_6H_5O_7 . 2H_2O$ | 30.0 g |
| Sodium hypophosphite $NaH_2PO_2 . H_2O$ | 20.0 g |
| Cobalt sulfate $CoSO_4 . 7H_2O$ | 13.2 g |

Figure 10:

The above reagents are dissolved in 900 ml of distilled water and the pH of the solution is adjusted to 8.5 using sodium hydroxide NaOH (400 g/l solution) and distilled water is added to the above solution to obtain exactly 1 l of a reagent solution. A permanent magnet is placed in this reagent solution and the solution is heated up to 80° C. Then there is added thereto 120 ml of palladium chloride $PdCl_2$ (g/l solution) reducing reaction is produced by which black cobalt particles are precipitated. The precipitate is recovered and dried as generally taught in Comparative Example 2. FIG. 10 is an electron micrograph of the cobalt particles obtained in this Example. The particles have a uniform particle size of about 200 Å but extend in adjacent relationship in a continuous fibriform manner. The coercive force of this fine powder is 1840 Oersteds.

As has been described in the foregoing, with the present invention, the excellent magnetic properties of ferromagnetic metal particles or ferromagnetic alloy particles of uniform particle size can be enhanced and their orientation property can be greatly improved. The ferromagnetic particles by the present invention can be used as magnetic recording media of highly excellent magnetic characteristics.

It will be apparent to those skilled in the art that any modifications and variations can be effected without departing from the spirit and scope of the novel concepts of this invention.

We claim:

1. In a method for the catalytic reduction of cobalt ions in aqueous solution, the improvement which comprises the step of heating a solution at a temperature ranging from about 20° C. below such solution's boiling point up to its boiling point for a time at least sufficient to form a precipitate of magnetizable particles, such solution comprising on a 100 weight percent total solution basis:
    (A) from about 0.5 to 10 weight percent of at least one water soluble dissolved cobalt salt, selected from the group consisting of cobalt sulfate, cobalt chloride, cobalt bromide, and cobalt sulfonate,
    (B) from about 0.5 to 10.0 weight percent of at least one water soluble dissolved reducing agent selected from the group consisting of alkali metal hypophosphites, hydrazine hydrate, hydrazine hydrochloride, and hydrazine sulfate,
    (C) from about 0.0001 to 0.02 weight percent of at least one water soluble dissolved metal salt catalyst wherein the metal is selected from the class consisting of Group VIII-B and Group I-B of the Periodic Table of the Elements,
    (D) from about 0.1 to 3.0 weight percent of at least one water soluble dissolved globular protein selected from the group consisting of albumin and hemoglobin,
    (E) sufficient water soluble dissolved base alkali metal hydroxide to produce in said solution a pH ranging from about 7.0 to 13.5, and
    (F) from about 65 to 95 weight percent water, the weight ratio of dissolved cobalt to all other dissolved metals in such solution being in the range from about 1:10 to 1:1, said heating being conducted in the presence of a magnetic field having a field strength of from about 50 to 5000 oersteds, such solution having been prepared by the steps of
    (a) preparing a first solution comprising on a 100 weight percent total first solution basis:
        (1) from about 0.5 to 10 weight percent of said cobalt salt,
        (2) from about 0.5 to 10.0 weight percent of said reducing agent,
        (3) from about 0.1 to 3.0 weight percent of said protein,
        (4) sufficient of said alkali metal hydroxide to produce in said first solution said pH, and
        (5) from about 65 to 95 weight percent of said water,
    (b) preparing a second solution comprising on a 100 weight percent total second solution basis:
        (1') from about 0.01 to 10 weight percent of said metal salt catalyst, and
        (2') from about 65 to 95 weight percent of said water, and
    (c) admixing said first solution with said second solution and adding to the resulting solution sufficient of said alkali metal hydroxide to produce said pH in such resulting solution, the relative ratio of said first solution to said second solution being such as to produce in such resulting solution a composition corresponding to such solution.

2. The process of claim 1, wherein said precipitate is separated, washed with water and air dried at a temperature ranging from about 20° to 120° C.

3. The process of claim 1, wherein said heating is accomplished in a time interval of from about 0.1 to 2 hours.

4. The process of claim 1 wherein said reducing agent is an alkali metal hypophosphite.

5. The process of claim 4, wherein said alkali metal hypophosphite is sodium hypophosphite.

6. The process of claim 1, wherein said metal salt catalyst is palladium chloride.

7. The process of claim 1, wherein said alkali metal hydroxide is sodium hydroxide.

8. The process of claim 1, wherein said water is initially distilled.

9. The process of claim 1, wherein said water is initially deionized.

10. The process of claim 1, wherein said solution additionally has dissolved therein from about 0.05 to 10 weight percent alkali metal carboxymethyl cellulose on a total 100 weight percent solution basis.

11. The process of claim 10, wherein said alkali metal carboxymethyl cellulose is sodium carboxymethyl cellulose.

12. Magnetic particles in powder form prepared by the process of claim 1 and having a powder particle size ranging from about 0.005 to 0.1 microns, said material comprising on a 100 weight percent total basis
    (A) from about 85 to 95 weight percent of metallic particles, said metallic particles being comprised of cobalt and characterized by having
        (1) each individual discrete cobalt particle ranging in size from about 100 up to 200 A°, and
        (2) substantially all of said particles being arranged in the physical form of a plurality of chains, each individual chain generally containing at least four of said particles in adjacent relationship to each other, and
    (B) from about 5 to 15 weight percent of a protein selected from the group consisting of hemoglobin and albumin.

13. The magnetic particles of claim 12, additionally containing from about 0.05 to 10 weight percent alkali metal carboxymethyl cellulose.

14. The magnetic particles of claim 12, wherein said protein therein comprises albumin.

15. The magnetic material of claim 12 wherein said protein therein comprises hemoglobin.

16. The magentic particles of claim 12 prepared in the presence of a magnetic field having a field strength of from about 50 to 5000 Oersteds.

* * * * *